United States Patent
Cardona et al.

(10) Patent No.: US 7,430,220 B2
(45) Date of Patent: Sep. 30, 2008

(54) SYSTEM LOAD BASED DYNAMIC SEGMENTATION FOR NETWORK INTERFACE CARDS

(75) Inventors: Omar Cardona, Austin, TX (US); James Brian Cunningham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 11/193,835

(22) Filed: Jul. 29, 2005

(65) Prior Publication Data

US 2007/0025395 A1 Feb. 1, 2007

(51) Int. Cl.
*H04J 3/16* (2006.01)
*H04J 3/24* (2006.01)

(52) U.S. Cl. ...................... 370/465; 370/474
(58) Field of Classification Search ............... 370/465, 370/468, 474; 709/230–237, 250; 712/237
See application file for complete search history.

(56) References Cited

U.S. PATENT DOCUMENTS

| | | | |
|---|---|---|---|
| 6,370,599 B1 * | 4/2002 | Anand et al. ............... 710/15 |
| 7,167,926 B1 * | 1/2007 | Boucher et al. ............ 709/250 |
| 7,305,493 B2 * | 12/2007 | McAlpine et al. .......... 709/250 |
| 2003/0158906 A1 * | 8/2003 | Hayes ........................ 709/211 |
| 2004/0010612 A1 * | 1/2004 | Pandya ....................... 709/230 |
| 2005/0091412 A1 * | 4/2005 | Pinkerton et al. .......... 709/250 |

OTHER PUBLICATIONS

"Method for operation-based adaptive transmit interrupt moderation", Jul. 2002, UTC, IP.com PriorArtDatabase, https://priorart.ip.com/viewPub.jsp?stype=dtFreeTextSearch&scache=20669019&snum=0&kwHighlight, 3 pages.

* cited by examiner

*Primary Examiner*—Kwang B. Yao
*Assistant Examiner*—Juvena Loo
(74) *Attorney, Agent, or Firm*—Duke W. Yee; Marilyn S. Dawkins; Brandon G. Williams

(57) ABSTRACT

The present invention provides a computer implemented method, system, and computer program product of dynamic segmentation based on processor load using various steps. If a network interface card is enabled for segmentation, a determination is made as to whether a processor utilization value is greater than a threshold. If processor utilization value is above the threshold, segments are offloaded to the network interface card, wherein segments are sent to the network interface card.

1 Claim, 4 Drawing Sheets

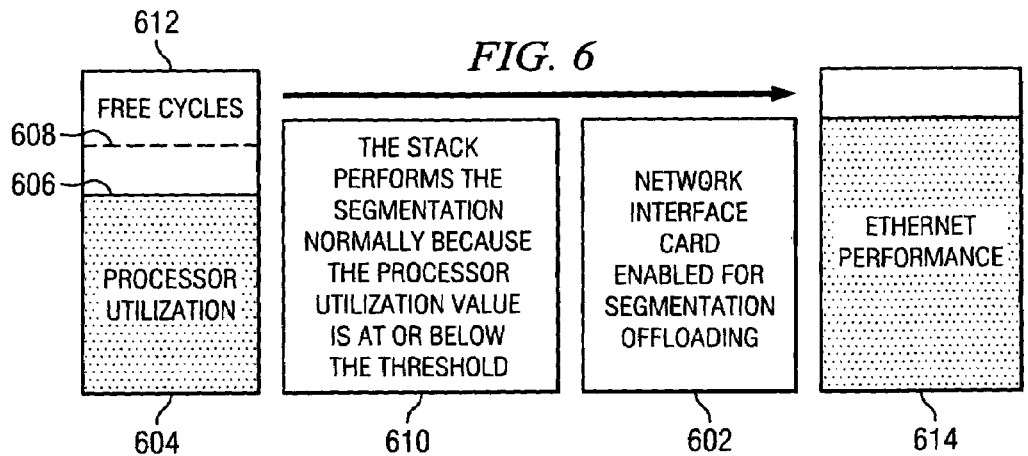
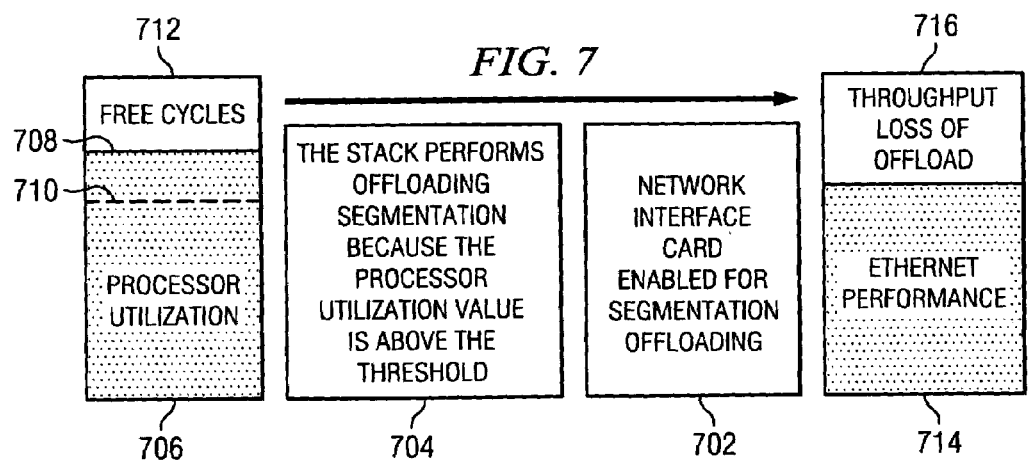

SYSTEM LOAD BASED DYNAMIC SEGMENTATION FOR NETWORK INTERFACE CARDS

BACKGROUND OF THE INVENTION

1. Field of the Invention

The present invention relates generally to segmentation and in particular, to a computer implemented, method, system, and computer usable code for dynamically implementing segmentation offloading based on processor utilization.

2. Description of the Related Art

Data communications have grown exponentially in recent years because of enhanced communications standards and network availability. Transmission control protocol (TCP) is a standard that ensures that packets of data are delivered and received in the same order they were sent and Internet Protocol (IP) is used in conjunction with TCP to designate how information travels between systems across the Internet. Most computers have a network interface card that uses the TCP/IP protocols to send and receive information through a network.

In a traditional network interface card, the TCP stack uses the system processor to break a TCP segment down into Ethernet frames before passing the data to the network interface card. This requires a large amount of processing time, especially in a Gigabit network where a network interface card can generate tens of thousands of interrupts per second. These interrupts utilize even more processor cycles.

In TCP segmentation offload, also known as "large send", the host TCP protocol stack creates a large TCP segment, up to 64 KB in size. This large segment is then passed to the IP Protocol stack, where the segment is encapsulated in a single IP packet. The encapsulated segment is then passed to the network interface card device driver using just one interrupt and finally to the network interface card for transmission. The network interface card which implements TCP segmentation offload then resegments this single large TCP segment into multiple smaller TCP segments which are typically 1460 bytes for a standard Ethernet connection and inserts the necessary Ethernet/IP/TCP header information for each segment.

The performance benefit of using segmentation offloading is gained by the fact that larger packets can be built by the host TCP stack, which typically translates into reduced host processor utilization. An additional performance benefit is gained by virtue of the fact that, in general, larger PCI data transactions translate into higher PCI bus throughput. Since the work of segmenting the buffer into Ethernet frames is done by the network interface card, the processor is available to perform other tasks.

Throughput is a measure of the amount of data transferred in a specific amount of time. Raw throughput is the sum of all data being passed through the adapter wherein scaled throughput is the amount of Ethernet data moved per host processor cycle. TCP segmentation offloading for the average user typically means higher Ethernet data raw throughput, higher Ethernet data scaled throughput, and reduced host processor utilization.

In current TCP segmentation offload implementations, the host TCP stack is notified by the network interface card driver that the network interface card supports TCP segmentation offload. The host TCP stack then autonomously decides whether to create large TCP segments using size-based algorithms. For example, if the host TCP stack is given a 4 KB data buffer to transmit or many smaller data buffers during a very short time period, the host TCP stack can decide to create a single large TCP segment or large send packet.

A significant limitation of TCP segmentation offload is that for some network interface cards, most notably those network interface cards which implement TCP segmentation offload in microcode, the raw Ethernet throughput is actually lower when TCP segmentation offload is enabled. This limitation is due to the fact that the network interface card's processor is unable to perform the TCP segmentation offload function at a sufficient rate. In this case, the Ethernet scaled throughput may still increase due to the fact that fewer host processor cycles are being consumed by the host TCP stack, but raw Ethernet throughput will decrease.

If the host processor is not fully utilized, it is better to not to have TCP segmentation offload enabled, in order to gain better RAW Ethernet throughput performance. However, if the host processor is fully utilized and therefore impacting application performance, response times, and overall system performance, enabling the TCP segmentation offload feature reduces the host processor utilization.

An additional limitation of TCP segmentation offload is that in order to enable or disable this feature, the network interface card driver requires reconfiguration in order to notify the host TCP stack of offload capability features. This may lead to wasted time and expense in addition to unnecessary network downtime. The user is forced to choose between the two non-dynamic states possible: processor driven TCP segmentation with increased Ethernet performance or network interface card driven TCP segmentation offloading with slightly lower Ethernet performance with the advantage of freed processor cycles.

SUMMARY OF THE INVENTION

The present invention provides a computer implemented method, system, and computer program product of dynamic segmentation based on processor load using various steps. If a network interface card is enabled for segmentation, a determination is made as to whether a processor utilization value is greater than a threshold. If processor utilization value is above the threshold, segments are offloaded to the network interface card, wherein segments are sent to the network interface card.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a block diagram illustrating the use of a system load based dynamic segmentation for a network interface card under a normal processor workload during which TCP segmentation is not implemented; and FIG. 7 is a block diagram illustrating the use of a system load based dynamic segmentation for a network interface card under a heavy processor workload during which TCP segmentation is implemented.

DETAILED DESCRIPTION OF THE PREFERRED EMBODIMENT

The different embodiments of the present invention provides a computer implemented method, system, and computer usable code that allows dynamic usage and self optimization of network performance through the use of segmentation offload features of a network interface card. An illustrative embodiment of the present invention is applicable to the TCP protocol. This embodiments allows the TCP stack to dynamically reach an optimal balance between processor utilization and Ethernet performance without changing the settings of the network interface card.

The TCP segmentation offloading network interface card is enabled for TCP segmentation offloading. The TCP stack determines whether processor usage is above or below a specified threshold. If the processor utilization is below the threshold, the TCP stack processes segments normally using the processor. If the processor utilization is above the threshold, the TCP stacks sends a large packet to the network interface card for segmentation wherein the TCP stack sends a large packet to the network interface card.

The embodiments of the present invention do not require costly and time-consuming reconfiguration of the network interface card to enable or disable the offload feature. As herein defined, a network interface card may be any of an Ethernet adapter, network card, local area network adapter, or any other network adapter used to send information between electronic devices. Modems, cable modems, and Ethernet cards are just a few of the currently available types of network interface cards.

The network interface card operates in conjunction with a network interface card driver. The network interface card driver is a software module that tells the operating system how to get data to and from the network interface card as well as how to control the network interface card. The network interface card and network interface card driver will herein be referred to generally as the network interface card. The majority of network interface cards have advanced features built into the Application Specific Integrated Circuit (ASIC) of the network interface card. However, some network interface cards use microcode to implement advanced features. As a result, the performance abilities of the network interface card may depend on whether it uses microcode, and if it does, performance limitations of executing the microcode on the network interface card.

Figure 1:
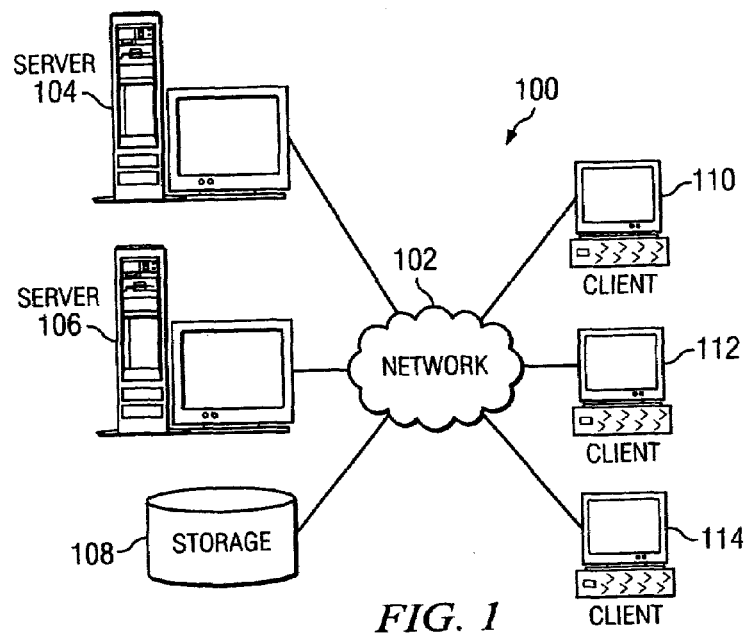
FIG. 1 is a pictorial representation of a network of data processing systems in which aspects of the present invention may be implemented.
Figure 2:
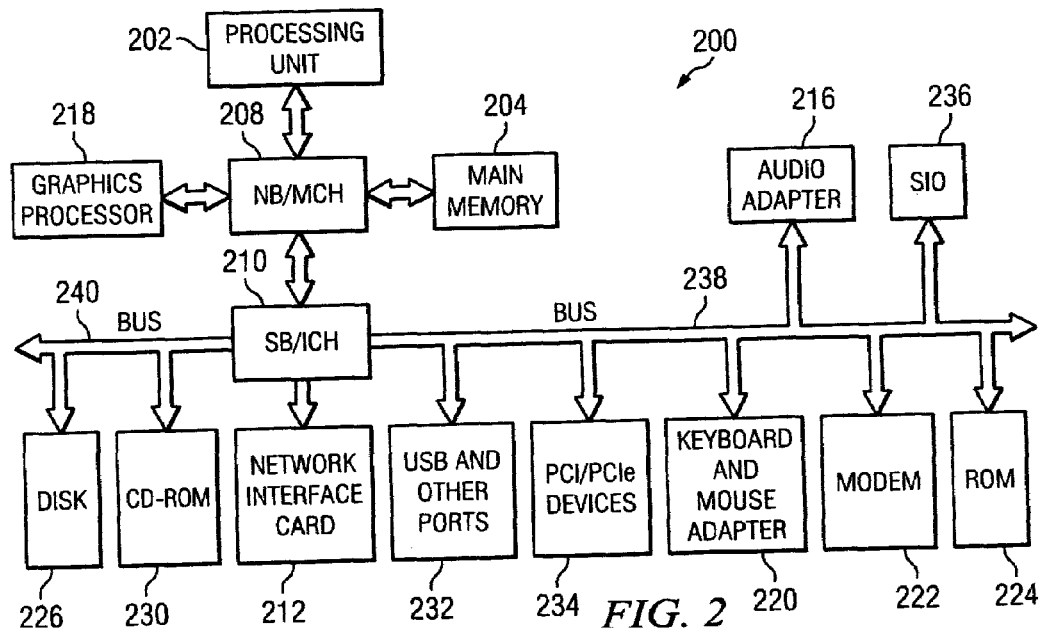
FIG. 2 is a block diagram of a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the transmission control protocol/Internet protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 208 and south bridge and input/output (I/O) controller hub (ICH) 210. Processing unit 202, main memory 204, and graphics processor 218 are connected to north bridge and memory controller hub 208. Graphics processor 218 may be connected to north bridge and memory controller hub 208 through an accelerated graphics port (AGP).

In the depicted example, a network interface card (NIC) 212 connects to south bridge and I/O controller hub 210. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 210 through bus 238 and bus 240. PCI/PCIe devices may include, for example, network interface cards, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 210 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 210.

An operating system runs on processing unit 202 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 202. Alternatively, a single processor system may be employed.

Instructions for the operating system, the object-oriented programming system, and applications or programs are located on storage devices, such as hard disk drive 226, and may be loaded into main memory 204 for execution by processing unit 202. The processes for embodiments of the present invention are performed by processing unit 202 using computer usable program code, which may be located in a memory such as, for example, main memory 204, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network interface card (NIC) 212 of FIG. 2. A memory may be, for example, main memory 204, read only memory 224, or a cache such as found in north bridge and memory controller hub 208 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
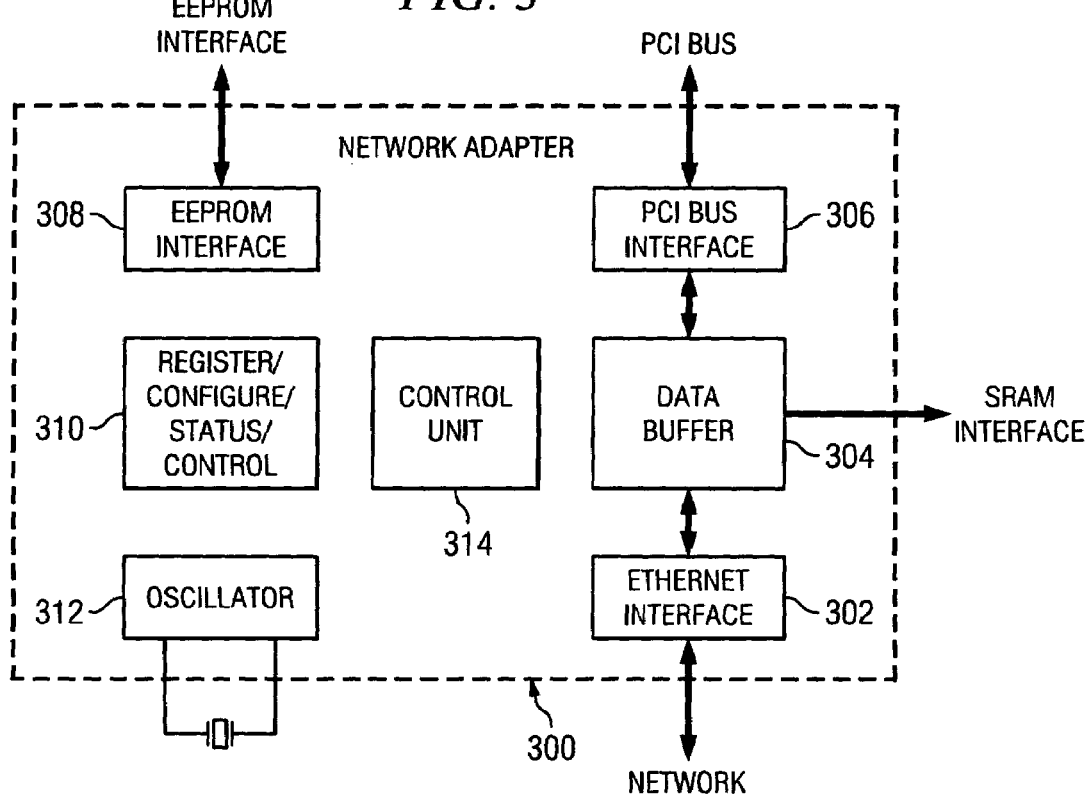
FIG. 3 is a block diagram of a network interface card in accordance with an illustrative embodiment of the present invention.

Turning now to FIG. 3, a diagram of a network interface card is depicted in accordance with a illustrative embodiment of the present invention. network interface card 300 may be implemented as network interface card 212 in FIG. 2. As shown, network interface card 300 includes Ethernet interface 302, data buffer 304, and PCI bus interface 306. These three components provide a path between the network and the bus of the data processing system. Ethernet interface 302 provides an interface to the network connected to the data processing system. PCI bus interface 306 provides an interface to a bus. Data buffer 304 is used to store data being transmitted and received through network interface card 300. This data buffer also includes a connection to a SRAM interface to provide for additional storage.

Network interface card 300 also includes electrically erasable programmable read-only memory (EEPROM) interface 308, register/configure/status/control unit 310, oscillator 312, and control unit 314. EEPROM interface 308 provides an interface to an EEPROM chip, which may contain instructions and other configuration information for network interface card 300. Different parameters and setting may be stored on an EEPROM chip through EEPROM interface 308.

Register/configure/status/control unit 310 provides a place to store information used to configure and run processes on network interface card 300. For example, a timer value for a timer may be stored within these registers. Additionally, status information for different processes also may be stored within this unit. Oscillator 312 provides a clock signal for executing processes on network interface card 300.

Control unit 314 controls the different processes and functions performed by network interface card 300. Control unit 314 may take various forms. For example, control unit 314 may be a processor or an application-specific integrated chip (ASIC). In these examples, the processes of the present invention used to manage flow control of data are executed by control unit 314. If implemented as a processor, the instructions for these processes may be stored in a chip accessed through EEPROM interface 308.

Data is received in receive operations through Ethernet interface 302. This data is stored in data buffer 304 for transfer onto the data processing system across PCI bus interface 306. For example, the data may be transferred onto a bus using a PCI local bus or via ICH 210 in FIG. 2.

Figure 4:
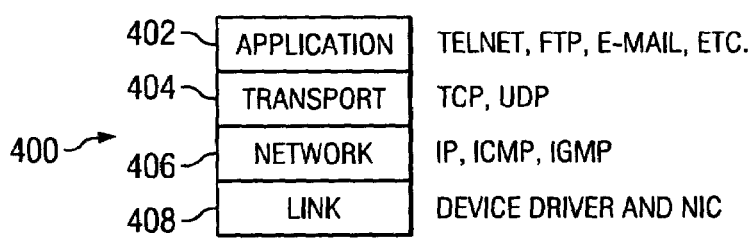
FIG. 4 is a diagram of a transmission control protocol/Internet protocol (TCP/IP) and similar protocols in accordance with an illustrative embodiment of the present invention.

FIG. 4 is a diagram of a transmission control protocol/Internet protocol (TCP/IP) and similar protocols and is depicted in accordance with a illustrative embodiment of the present invention. TCP/IP and similar protocols are utilized by communications architecture 400. In this example, communications architecture 400 is a 4-layer system. This architecture includes application layer 402, transport layer 404, network layer 406, and link layer 408. Each layer is responsible for handling various communications tasks. Link layer 408 also is referred to as the data-link layer or the network interface layer and normally includes the device driver in the operating system and the corresponding network interface card in the computer. This layer handles all the hardware details of physically interfacing with the network media being used, such as optical cables or Ethernet cables.

Network layer 406 also is referred to as the internet layer and handles the movement of packets of data around the network. For example, network layer 406 handles the routing of various packets of data that are transferred over the network. Network layer 406 in the TCP/IP suite is comprised of several protocols, including Internet Protocol (IP), Internet control message protocol (ICMP), and Internet group management protocol (IGMP).

Next, transport layer 404 provides an interface between network layer 406 and application layer 402 that facilitates the transfer of data between two host computers. The dynamic segmentation method described in embodiments of the present invention may be implemented using various transfer protocols. Transport layer 404 is concerned with things such as, for example, dividing the data passed to it from the application into appropriately sized chunks for the network layer below, acknowledging received packets, and setting timeouts to make certain the other end acknowledges packets that are sent. In the TCP/IP protocol suite, two distinctly different transport protocols are present: TCP and user datagram protocol (UDP). TCP provides reliability services to ensure that data is properly transmitted between two hosts, including dropout detection and retransmission services.

TCP segmentation is used as an exemplary implementation of embodiments of the present invention and in no way limits dynamic segmentation offload to the TCP suite of protocols. In other embodiments, dynamic segmentation offloading may be used with any transport protocol, for example, user datagram protocol and other versions of TCP protocol including TCP checksum offload protocol as a few of many alternative protocols.

Conversely, user datagram protocol provides a much simpler service to the application layer by merely sending packets of data called datagrams from one host to the other, without providing any mechanism for guaranteeing that the data is properly transferred. When using UDP, the application layer must perform the reliability functionality.

Application layer 402 handles the details of the particular application. Many common TCP/IP applications are present for almost every implementation, including a Telnet for remote login; a file transfer protocol (FTP); a simple mail transfer protocol (SMTP) for electronic mail; and a simple network management protocol (SNMP).

The computer implemented methods of embodiment of the present invention are applicable to the functionality of all of the layers but is specifically applicable to the network interface card in the link layer.

Figure 5:
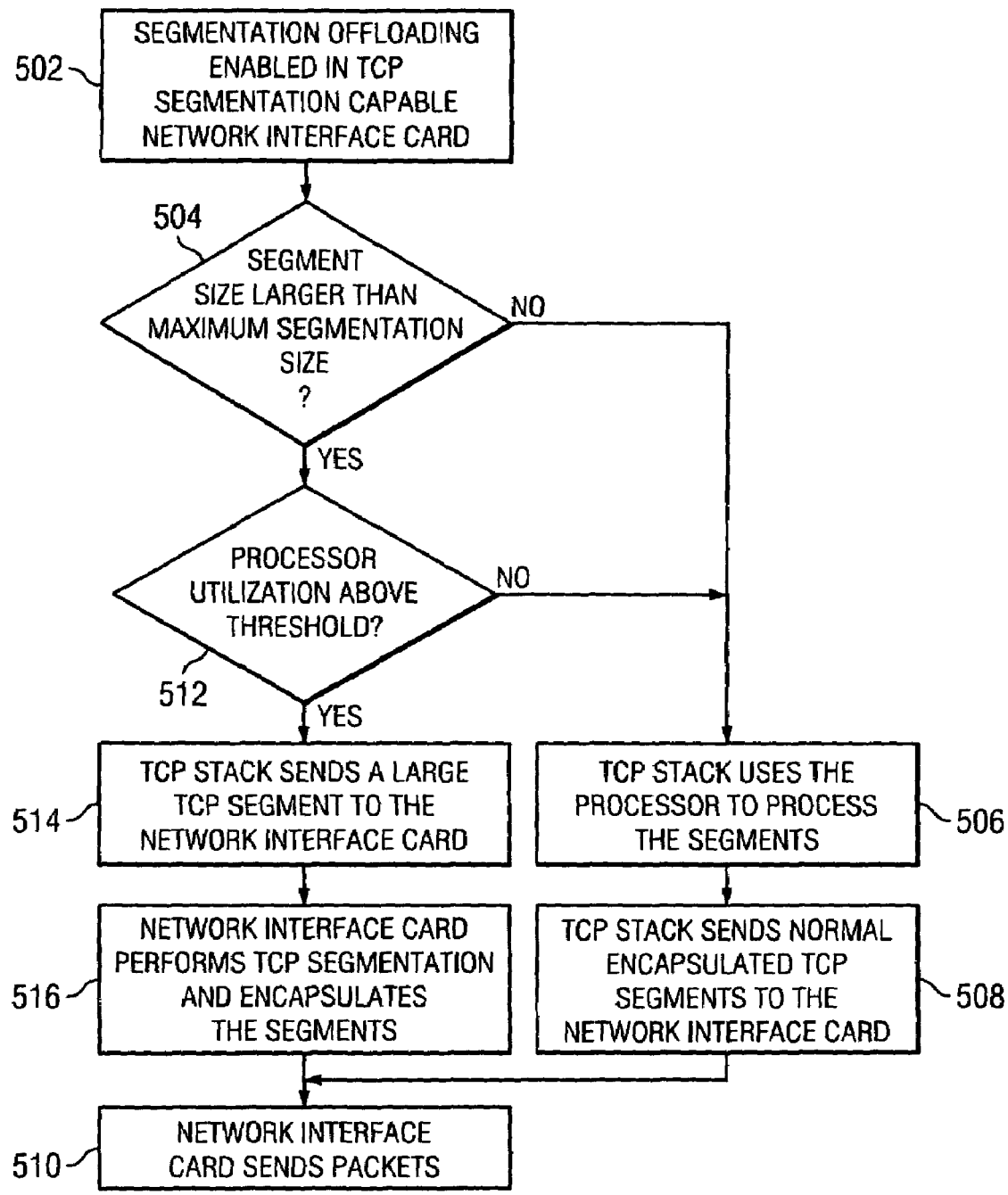
FIG. 5 is a flowchart illustrating the operation of a system load based dynamic TCP segmentation for a network interface card in accordance with an illustrative embodiment of the present invention.

FIG. 5 is a flowchart illustrating the operation of a system load based dynamic TCP segmentation for network interface card in accordance with an illustrative embodiment of the present invention. TCP is a protocol often used for data transfer and for that reason provides an illustrative example of an implementation of one embodiment of the present invention in an exemplary protocol. A TCP stack is implemented in the operating system of a device and is executed by the processor. The TCP stack sends and receives information from the network interface card driver to ensure successful segmentation. Instructions for the TCP stack and corresponding operating system may be stored, loaded, and executed in a data processing system, such as hard disk drive 226, main memory 204, and executed by processing unit 202 or network interface card (NIC) 212 shown in FIG. 2.

When a data processing system has multiple microcode and non-microcode network interface cards, the TCP stack determines which network interface cards are capable of segmentation offloading. The TCP stack may evaluate the execution speed of the network interface card to see if segmentation offloading will be beneficial. In some cases, offloading segmentation to the network interface card is not a viable option because of the microcode execution limitations of the network interface card. If segmentation offloading will not increase Ethernet performance, the TCP stack may choose not to implement segmentation offloading regardless of processor utilization.

Embodiments of the present invention are used when the network interface card has TCP segmentation offloading enabled (step 502). The TCP stack determines whether the segment size is larger than the maximum segment size (step 504). The maximum segment size is a TCP standard used to determine the largest quantity of data that can be transmitted at one time. The maximum segment size is typically the maximum transmission unit size minus the TCP/IP/Ethernet headers. The TCP stack always decides what the negotiable maximum segment size is for transmission based on the type of network interface. If a segment greater than the maximum segment size or packet greater than the maximum transmission unit is passed to the network interface card it must be "resegmented" of "fragmented" by dividing it into smaller segments or packets in order to fit the standard format of the transmission protocol.

If the segment is no larger than the maximum segment size (step 504), the segments are processed normally. The TCP stack uses the processor to process the segments (step 506) and encapsulate them into packets as is normally done without segmentation offloading. An encapsulated packet is a properly sized segment with the necessary header information attached to it in a single transmissible unit. Normal processing for other protocols entails encapsulation in accordance with the applicable protocol for segmentation size and header information. The TCP stack sends the standard encapsulated packets to the network interface card (step 508). The network interface card sends the packets (step 510) across the network.

The standard maximum transmission unit for a standard Ethernet interface is approximately 1500 bytes when encapsulated. The maximum transmission unit using network interface cards set to transmit Ethernet jumbo frames is 9014 bytes.

Reliable networks have prompted more use of protocols with increased maximum transmission units because throughput and network performance typically increases as larger packets are sent and received. The maximum segment size and maximum transmission unit may vary depending on the protocol, network interface card and network interface, but the application of embodiments of the present invention are applicable to all network interface cards that are enabled for segmentation offload. Typically, processor processing of segments is faster than microcode based network interface card processing which maximizes Ethernet performance.

In one illustrative embodiment, the host TCP stack is aware of host processor utilization in order to determine when to use offloading. A threshold specifies the point at which TCP segmentation offloading should begin because processor utilization is burdened by segmentation offloading at the expense of system performance. A processor utilization value is compared with the threshold to judge when TCP segmentation offloading should occur. The processor utilization value may be an absolute value, average, time average, mean, or other statistic number or value based on processor load and utilization.

In the illustrative embodiment, the TCP stack polls the processor using a system call, or a system, information request. The processor utilization value may be obtained from a single request or from multiple requests or the average of multiple requests. In one embodiment, processor utilization is based on the average processor utilization as polled over a specific amount of time. For example, multiple processor utilization values may be collected and averaged over a one-second period to compare the processor utilization value to the threshold.

The threshold may be a user specified value, but includes in the illustrative examples, a default value. For example, in most situations a threshold value of between 70 percent to 100 percent utilization efficiently triggers segmentation offloading. The threshold may be set based on different factors, such a personal preference, average processor usage, or any other relevant factor. With a higher threshold, the TCP stack less often implements offload segmentation based on normal processor usage.

With reference again to step 504, if the segment is equal to or less than the maximum segment size, the TCP stack uses the processor to process the segments (step 506) and encapsulate them into packets as is normally done without segmentation offloading. The TCP stack sends the standard encapsulated packets to the network interface card (step 508). The network interface card sends the packets (step 510) across the network.

With reference again to step 504, if the segment is larger than the maximum segment size, the TCP stack uses the processor utilization value to determine whether this value is above the threshold (step 512).

In step 512, if system processor utilization is above the threshold value, dynamic offload processing of TCP segmentation packets to the network interface card is employed. Although TCP segmentation offloading typically decreases the raw Ethernet throughput, the scaled throughput and aggregate system performance may increase. These performance increases result from not further burdening the processor with TCP segmentation when the processor already is being utilized above the specified threshold value. This feature allows the processing ability of the processor to be used for other applications and processes thereby increasing overall system performance.

TCP segmentation offload is implemented by the TCP stack by sending a large TCP segment to the network interface card (step 514). A "large send" is a segment that is greater than the maximum transmission unit for the interface protocol. As herein defined, a large send is a segment size that must, by necessity, be divided into smaller segments by the network interface card for transmission before it can be sent using the applicable protocol. In some TCP embodiments, a large send may be up to 64 kilobytes in size. The TCP stack forces the network interface card to perform segmentation offloading under the conditions described by sending a large segment as described with reference to step 514. In some cases, the network interface card driver must receive a flag from the TCP stack demarking the packet as a "large send" packet. This flag will accompany the large segmentation when sent from the TCP stack. The network interface card performs the TCP segmentation and encapsulates the segments (step 516) internally freeing processor cycles for non-Ethernet related tasks thereby increasing aggregate system performance. In step 516, once the network interface card has performed TCP segmentation and encapsulation, the appropriate Ethernet/IP/TCP header is inserted for each frame, the network interface card sends the packets (step 510).

FIG. 6 is a block diagram illustrating the use of a system load based dynamic segmentation for network interface cards under a normal processor utilization during which segmentation is not implemented. The dynamic segmentation may be performed in conjunction with a transport level protocol, such as TCP for an Ethernet interface, shown in transport 404 of FIG. 4. The network interface card is enabled for TCP segmentation 602 regardless of whether the TCP stack induces segmentation or not. When processor utilization 604 is at processor utilization value 606 that is at or below threshold 608 the TCP stack performs segmentation 610. TCP stack performs segmentation 610 because sufficient free cycles 612 are present to ensure that segmentation does not occur at the expense of other processor processes. As a result, Ethernet performance 614 is maximized by using free cycles 612 of the processor for segmentation 610 when processor utilization 604 is at or below threshold 606.

FIG. 7 is a block diagram illustrating the use of a system load based dynamic segmentation for network interface cards under a heavy processor workload during which TCP segmentation is implemented. The dynamic segmentation may be performed in conjunction with a transport level protocol such as transport 404 of FIG. 4. The present embodiment allows the network interface card to always be enabled for TCP segmentation offload 702. The network interface card only performs segmentation offloading 704 when the TCP stack determines that processor utilization 706 is at utilization value 708 above threshold 710. The TCP stack forces segmentation offloading 704 by passing a "large send" packet to the network interface card for segmentation 704 and transmission. Because processor utilization value 708 is above threshold 708 it is likely that there are insufficient free cycles 712 for the processor to perform segmentation as directed by the TCP stack and the other processes it is given. The overall system may slow at the expense of TCP segmentation if processor utilization 706 is saturated. During segmentation offloading 704 the processor is relieved of TCP segmentation, but raw Ethernet performance 714 may decrease because of the throughput loss of performing offload 716.

In most situations, increased Ethernet performance 714 is irrelevant if the processor is so tied up performing TCP stack segmentation that the processor cannot adequately perform the other tasks it is processing. The present embodiment allows Ethernet performance 714 to be optimized based on processor workload 706. TCP segmentation is only offloaded 704 when doing so will increase system performance by increasing free processor cycles 712 for other tasks. As a result, the overall system performs at maximized levels, and Ethernet performance 714 does not bog down the processor. Raw Ethernet throughput may decrease during offloading, but scaled Ethernet throughput and overall system performance increases.

The present invention is implemented in the operating system TCP stack in these examples because this type of implemntation does not require extensive driver modifications. In other embodiments, the segmentation may be performed by software linked with the network interface card rather than by the network interface card when the processor utilization value is above the threshold.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least, one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of dynamic segmentation based on processor load, the computer implemented method comprising:

determining whether a network interface card is a microcode based network interface card or a non-microcode based network interface card;

evaluating performance limitations of the microcode based network interface card, wherein segments are not processed if the microcode based network interface card performs segmentation slower than normal segmentation processing;

responsive to the network interface card being enabled for segmentation, polling for processor utilization to determine whether a processor utilization value is greater than a threshold, wherein the processor utilization value is a timed average to prevent excessive switching between offloading segmentation, and wherein the threshold is selected from the group consisting of a user specified threshold and a default threshold, a value of the default threshold being between 70 and 100 percent processor utilization;

responsive to the processor utilization value being above the threshold, creating a segment having a size greater than a maximum segment size of an interface protocol, wherein the interface protocol is selected from the group consisting of TCP/IP and user datagram protocol;

further responsive to the processor utilization value being above the threshold, sending the segment to the network interface card for segmentation, wherein the segment segmented by the network interface card during offloading segmentation is compatible with a standard Ethernet protocol or a jumbo frame Ethernet protocol; and responsive to the processor utilization value being below or equal to the threshold, processing the segment normally using a transmission control protocol stack.

* * * * *